2,860,749

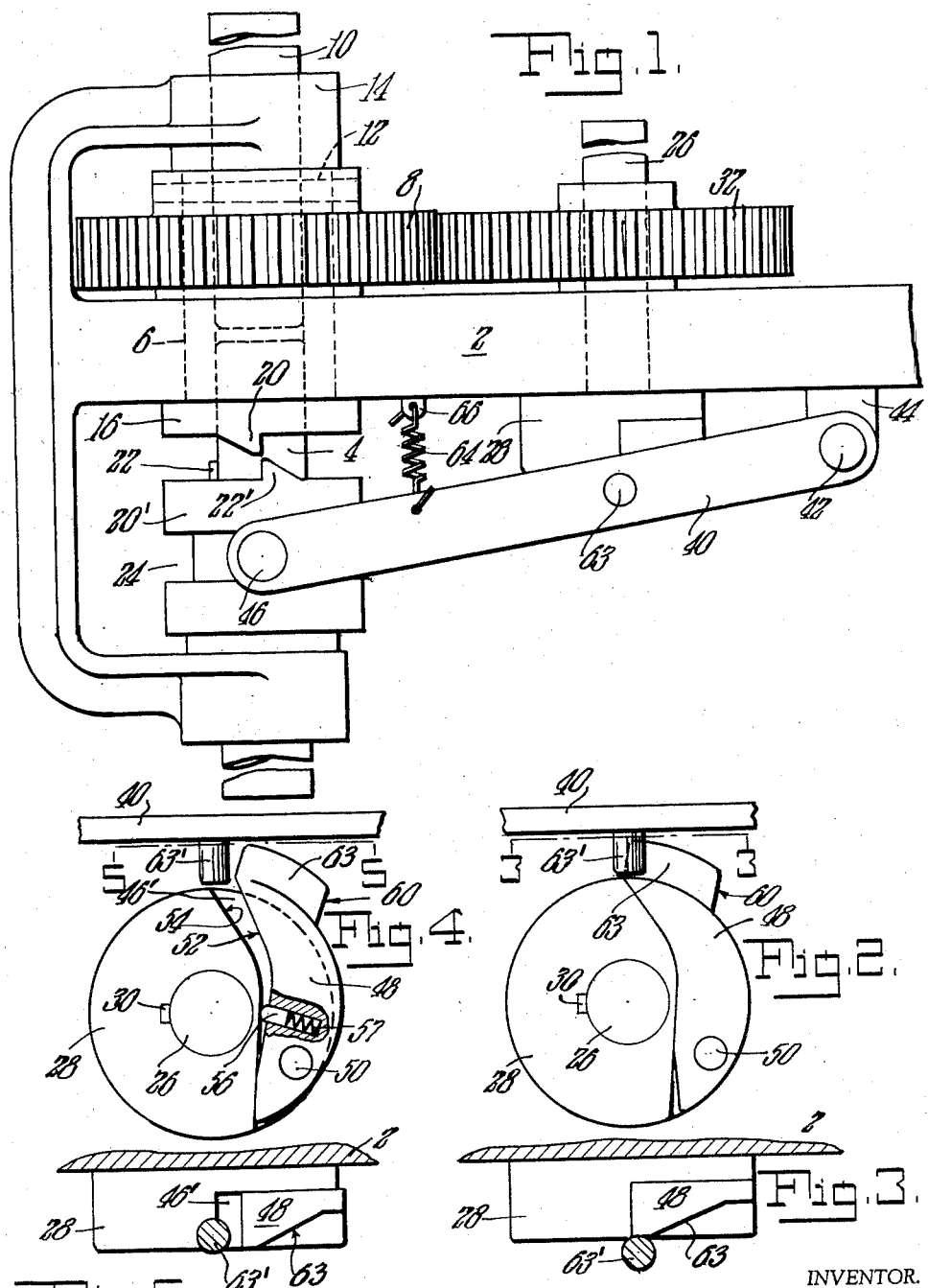

CLUTCH FOR DRIVING MECHANISM

Max J. Keltz, Springfield, Mass., assignor to Perkins Machine & Gear Co., West Springfield, Mass., a corporation of Massachusetts Application July 22, 1957, Serial No. 673,243

1 Claim. (Cl. 192—33)

This invention relates to improvements in drive mechanism and is directed to means to disable the same.

The principal object of the invention is the provision of mechanism to bring about disengagement of driving and driven elements when a component has been rotated through a certain angle.

In machines of numerous types it is desired and necessary to disengage a drive clutch from a driven element when a rotating element has been rotated through a certain predetermined angle.

Where clutch mechanisms are employed which have engageable teeth it is often difficult to disengage the teeth at a time when an element has been rotated through a desired predetermined angle. More often the element is rotated more or less than the desired angle, and improper or inaccurate operation results.

According to this invention mechanism is provided to facilitate the disengagement of clutch teeth which is motivated by driving means for the mechanism.

The disengagement of the clutch teeth is positive. The mechanism initiating said disengagement being motivated by driving means insures disengagement without overtravel whereby an element may be rotated through a desired and definite angle.

For purposes of disclosing the invention the mechanism is such that an element is rotated through 360 degrees in each cycle of operation. In other words the mechanism operates to disengage clutch teeth on a revolution thereof.

It is possible by means of the mechanism to obtain rotation of an element through a predetermined angle without under or over travel due to the operation of a clutch.

Various changes and modifications may be made in the form of apparatus embodying the novel features of the invention, without departing from the spirit and scope thereof.

In the drawings:

Fig. 1 is a plan view of driving apparatus embodying the novel features of the invention;

Fig. 2 is an elevational view of the cam member of the apparatus shown in Fig. 1;

Fig. 3 is a sectional plan view on the line 3—3 of Fig. 2;

Fig. 4 is a view similar to Fig. 2 with parts in a different position; and

Fig. 5 is a sectional plan view on the line 5—5 of Fig. 4.

Referring now to the drawings in detail the novel features of the invention will be described.

A supporting structure 2 is provided in which a drive shaft 4 is rotatable. A bushing or bearing 6 is rotatable in the support. A drive gear 8 and shaft 10 are secured to the bushing as by a pin 12. The outer end of the shaft 10 is rotatable in a bearing portion 14 of the support and the inner end of the drive shaft 4 is rotatable in the bushing 6.

It will be assumed that the shaft 4 may be in constant rotation and driven from a suitable source.

The bushing 6 is provided with a portion 16 having one or more teeth, such as 20. A clutch member 20' is slidable on the drive shaft 4 and is held against rotation thereon by a key 22. Said member 20' is provided with one or more teeth such as 22' for engaging with the teeth 20, and has an annular groove 24 therearound.

A cam shaft 26 is rotatable in the support 2 and has a cam 28 fixed on one end thereof, as by a key 30. A gear 32 fixed on the said cam shaft 26 is in mesh with gear 8 of the shaft 10. As the bushing 6 and shaft 10 are in rotation counterclockwise the shaft 26 through the gears is rotated in a clockwise direction.

A shifting lever 40 is pivoted at 42 to an ear 44 of the support 2 and has a roll 46 on its end which is disposed in the groove 24 of the clutch part 20.

The clutch teeth are disengaged in Fig. 1, and as the lever 40 is swung clockwise the member 20' is moved relative to shaft 4 to engage the clutch teeth so that bushing 6 and shaft 10 are rotated by the drive shaft. Rotation of shaft 6 results in rotation of shaft 26 and its cam 28.

The cam member 28 which is fixed to the shaft 26 is in the form of a disc and has a forward face thereof cut away at 46', see Fig. 4. A cam 48 in the cut-out of member 28 is pivoted to the member at 50. The inner edge 52 of the cam is complemental to the edge 54 of the cut-out of the disc 28.

A detent 56 of the member 48 is spring pressed outwardly by a spring 57 to act on the edge 54 of the cam member so that the cam 48 is urged to an outer position shown in Figs. 4 and 5.

The cam 48 has a radially extending cam portion 60 which is provided with an outer cam face 63. Said face 62 is inclined outwardly, as shown in Figs. 3 and 5. The member 48 of the cam member is in its inner position in Figs. 2 and 3, and in its outer position in Figs. 4 and 5.

The clutch lever 40 is provided with a stud 63' depending therefrom which is adapted to be engaged by the face 63 of the cam 60.

A spring 64 has opposite ends secured to the lever 40 and to an anchor 66 of the support and tends to swing said lever clockwise.

Figs. 1, 2 and 3 show the position of the parts with the clutch teeth disengaged. In this position shaft 4 may be in rotation, but shafts 10 and 26 are at rest.

The cam face 63 has swung the lever 40 outwardly and the stud 63' of said lever is held against the outermost part of the cam face 63 by spring 64.

The lever 40 is swung counterclockwise, by any suitable means, and against action of the spring 64. As the cam face 63 is released by the stud 63', the detent 56 acts to swing the cam 48 from the position of Figs. 2 and 3 to the position of Figs. 4 and 5.

When lever 40 is released the spring 64 swings the lever 40 clockwise. The stud 63' passes by the end of cam 60 so that the lever 40 shifts member 20' to engage the clutch teeth.

The shaft 10 is then rotated so that shaft 26 is rotated. As the cam member is rotated the cam face 63 engages the stud 63' of lever 40 to shift member 20 which disengages the clutch teeth.

The gears 8 and 32 may be of any desired ratio. In the present disclosure shafts 10 and 26 are stopped on one revolution thereof.

Thus it is possible to arrest rotation of shaft 26 when it has rotated through 360 degrees. In each revolution of said shaft the clutch teeth are disengaged, and thereby any component connected to the shafts 10 or 26 may be brought to rest at each revolution of shaft 26.

Having described the invention in the form at present preferred it is desired to secure and claim the following:

Driving mechanism comprising in combination, a support, separate driving and driven shafts in axial alignment and rotatable in said support, a cam shaft rotatable in said support, gearing connecting said cam shaft and driven shaft whereby the former is driven by the latter, clutch mechanism for operatively connecting said driving and driven shafts including a shiftable member for connecting or disconnecting said mechanism, a lever swingable on said support in opposite directions operatively connected to said shiftable member to connect or disconnect said clutch mechanism and having a cam engageable part, spring means urging said lever in clutch connecting direction, and a cam on said cam shaft having means adapted to engage the cam engageable part of said lever to swing said lever in clutch disconnecting direction and then to release said lever for said spring means to swing said lever in clutch connecting direction, said cam being in the form of a disc provided with a cut-out on its forward face and with a part pivoted in the cut-out for swinging in and out on an axis parallel to the axis of said cam shaft and having a cam portion provided with a face disposed in a plane angularly related to a plane at right angles to the longitudinal axis of said cam shaft.

References Cited in the file of this patent

UNITED STATES PATENTS

| | | |
|---|---|---|
| 330,851 | Puetz | Nov. 17, 1885 |
| 497,146 | Tinney | May 9, 1893 |
| 919,006 | Hancock | Apr. 20, 1909 |
| 1,870,226 | Bishop | Aug. 9, 1932 |
| 1,958,121 | Winquist | May 8, 1937 |
| 2,532,266 | Andres | Nov. 28, 1950 |